United States Patent
Wishnie et al.

[11] Patent Number: 6,148,311
[45] Date of Patent: Nov. 14, 2000

[54] WEB SITE CONSTRUCTION BY INFERRING NAVIGATIONAL STRUCTURE FROM PHYSICAL FILE STRUCTURE

[75] Inventors: Jeffrey L. Wishnie, San Francisco; Alan K. Eyzaguirre, Santa Cruz; Kai L. Quinto, San Francisco, all of Calif.

[73] Assignee: Adobe Systems Incorporation, San Jose, Calif.

[21] Appl. No.: 08/845,730

[22] Filed: Apr. 25, 1997

(Under 37 CFR 1.47)

[51] Int. Cl.[7] .................................................. G06F 17/21
[52] U.S. Cl. ........................ 707/513; 707/104; 345/356; 706/45
[58] Field of Search ..................................... 345/356, 357, 345/440; 709/217–219; 706/45–47; 707/500, 501, 513–514, 104

[56] References Cited

U.S. PATENT DOCUMENTS

| | | | |
|---|---|---|---|
| 5,546,517 | 8/1996 | Marks et al. | 395/145 |
| 5,625,781 | 4/1997 | Cline et al. | 395/335 |
| 5,634,062 | 5/1997 | Shimizu et al. | 395/762 |
| 5,701,137 | 12/1997 | Kiernan et al. | 345/119 |
| 5,727,129 | 3/1998 | Barrett et al. | 395/12 |
| 5,793,966 | 8/1998 | Amstein et al. | 709/218 |
| 5,801,702 | 9/1998 | Dolan et al. | 345/357 |
| 5,845,290 | 12/1998 | Yoshii | 707/104 |
| 5,890,170 | 3/1999 | Sidana | 707/501 |
| 5,903,902 | 5/1999 | Orr et al. | 707/517 |
| 5,911,145 | 6/1999 | Arora et al. | 707/514 |

OTHER PUBLICATIONS

Jones, J.L., Nif–T–Nav: A Hierarchical Navigator for WWW Pages, Fifth International World Wide Web Conference, May 6–10, 1996, Paris, France [online], [retrieved Aug. 16, 1999]. Retrieved from Internet: <URL:http://www5conf.inria.fr/fich_html/papers/P39/Overview.html>.

Primary Examiner—Joseph H. Feild
Attorney, Agent, or Firm—Fish & Richardson, PC

[57] ABSTRACT

A method and apparatus for inferring navigational hierarchy for a web site from an existing file hierarchy having one or more HTML files. The method includes inferring a navigational hierarchy for a web site from physical relationships between the HTML files stored in the existing file hierarchy. The method may include ordering the HTML files according to the navigational hierarchy for manipulation by a web site construction tool and displaying the ordered HTML files in a tree structure or an organizational chart structure indicative of the navigational hierarchy for the web site. The existing file hierarchy may include a directory and one or more sub-directories each including one or more HTML files. The method may include creating an initial level in the navigational hierarchy for all HTML files in the directory. Each file in the initial level includes a link to a next sequential file physically located in the file hierarchy that is assigned to the initial level of the navigational hierarchy. The method may include creating a second level in the navigational hierarchy for HTML files in a sub-directory of the directory.

20 Claims, 8 Drawing Sheets

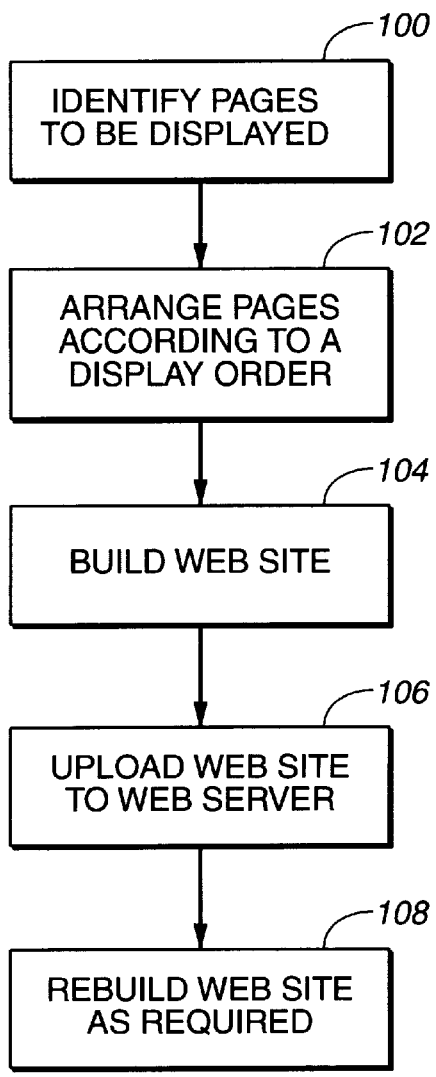
FIG._1
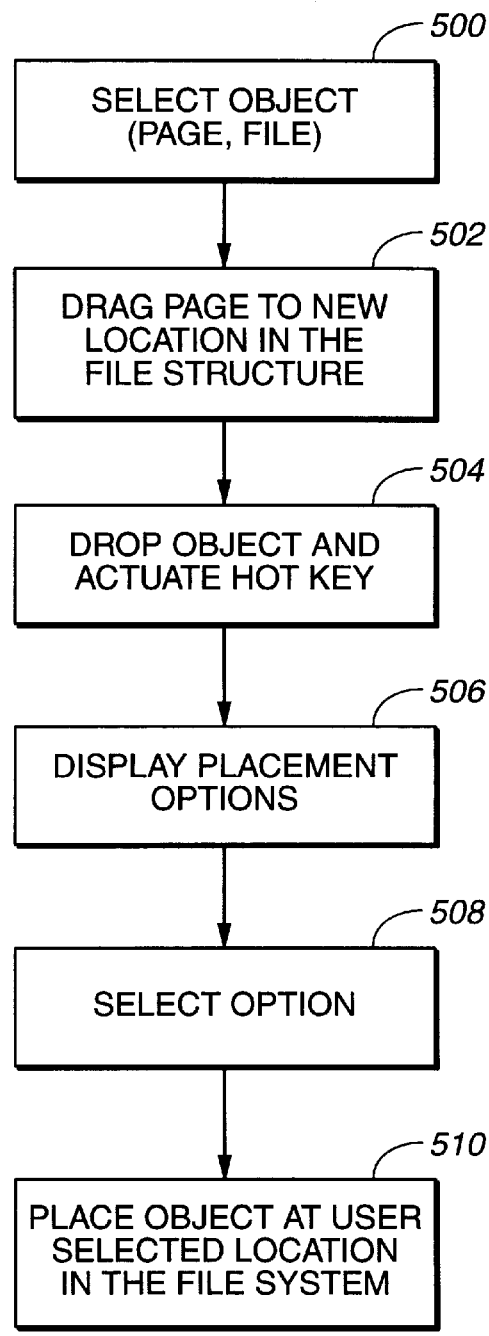
FIG._5

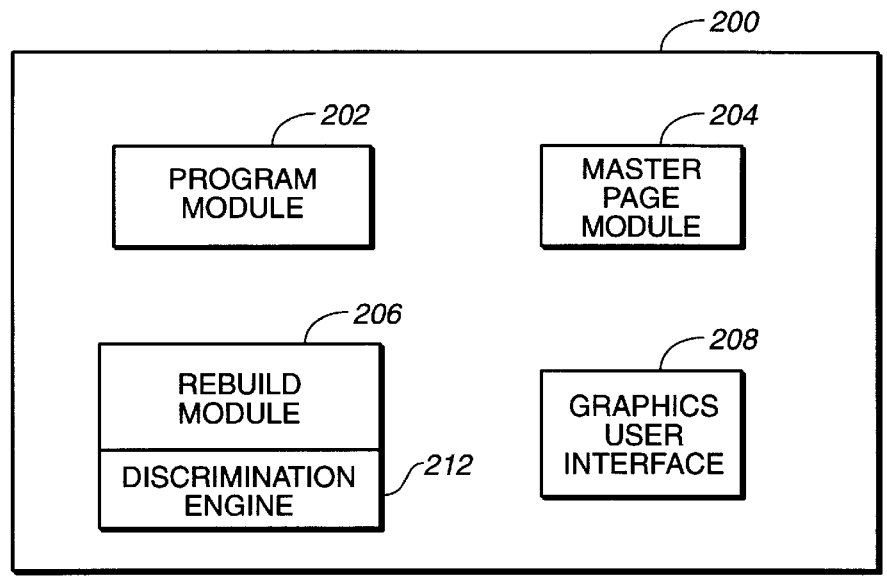
FIG._2
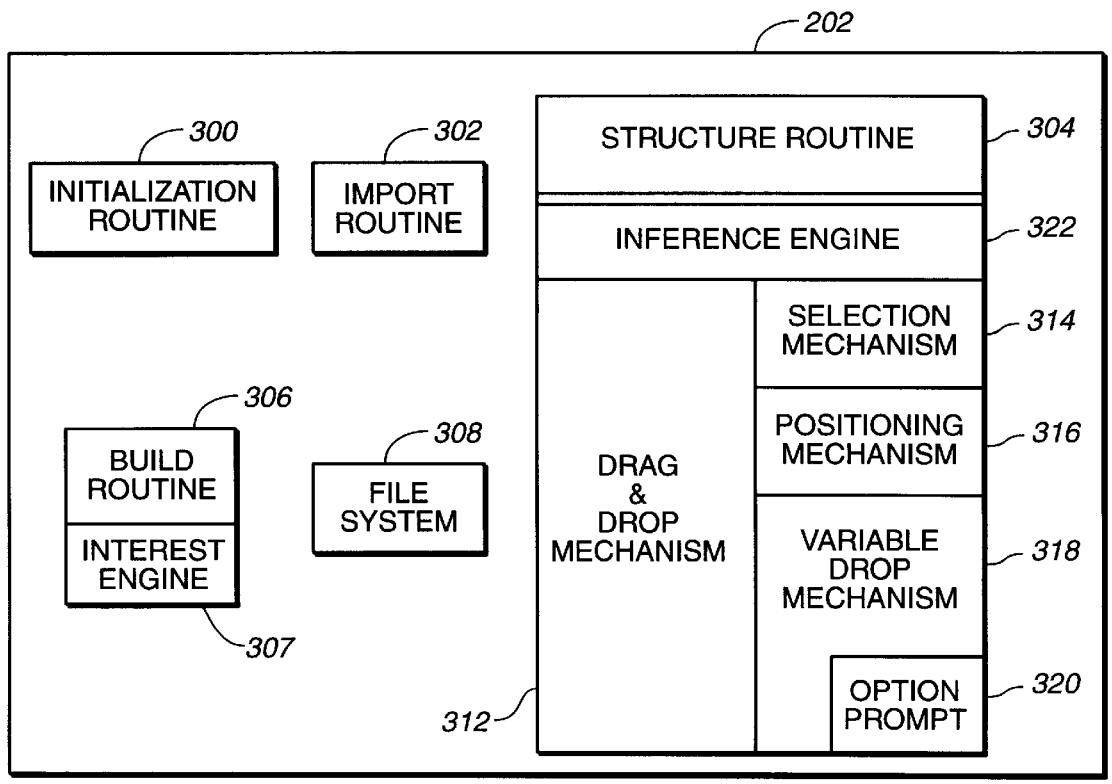
FIG._3

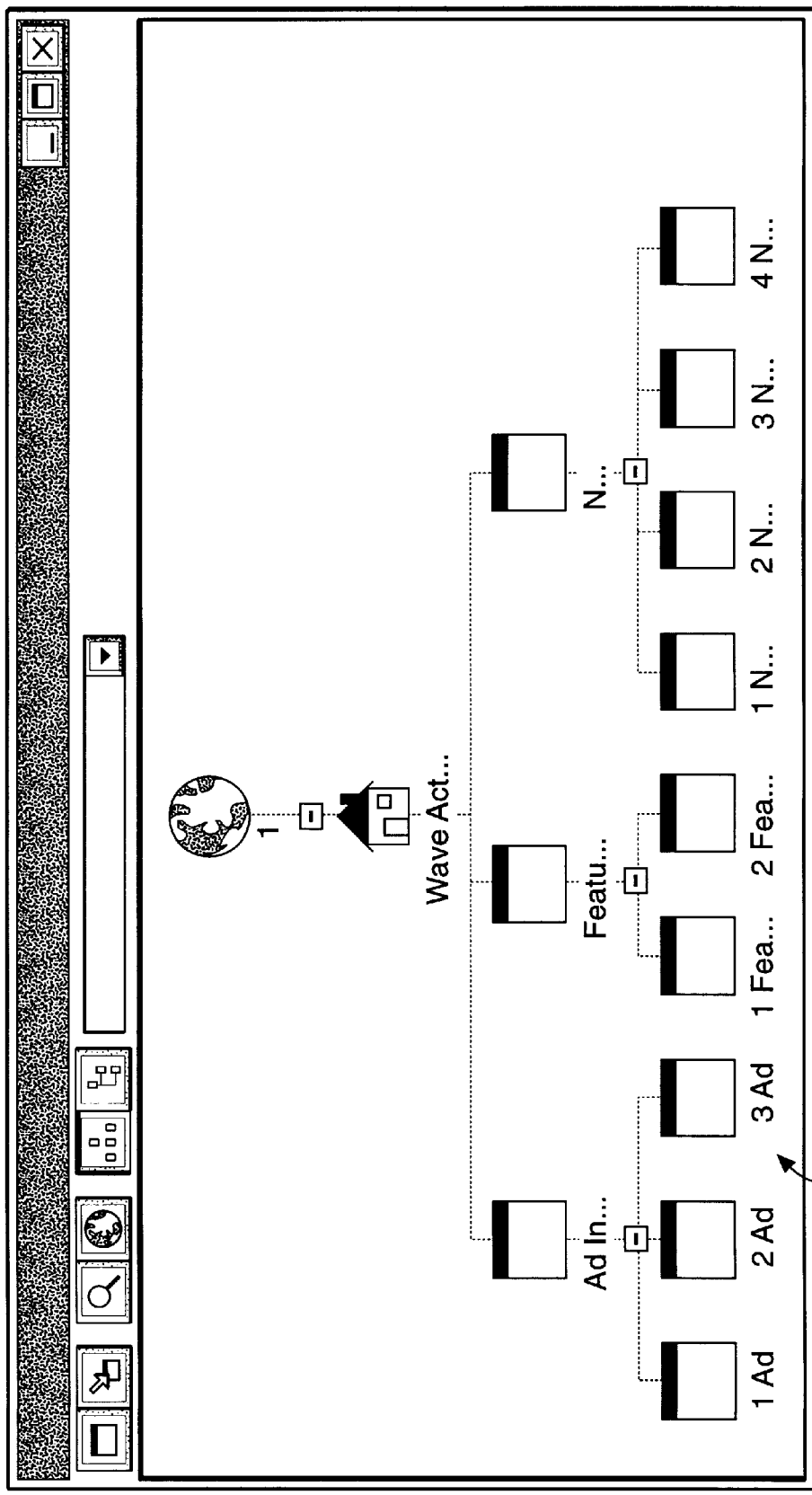
FIG._4b

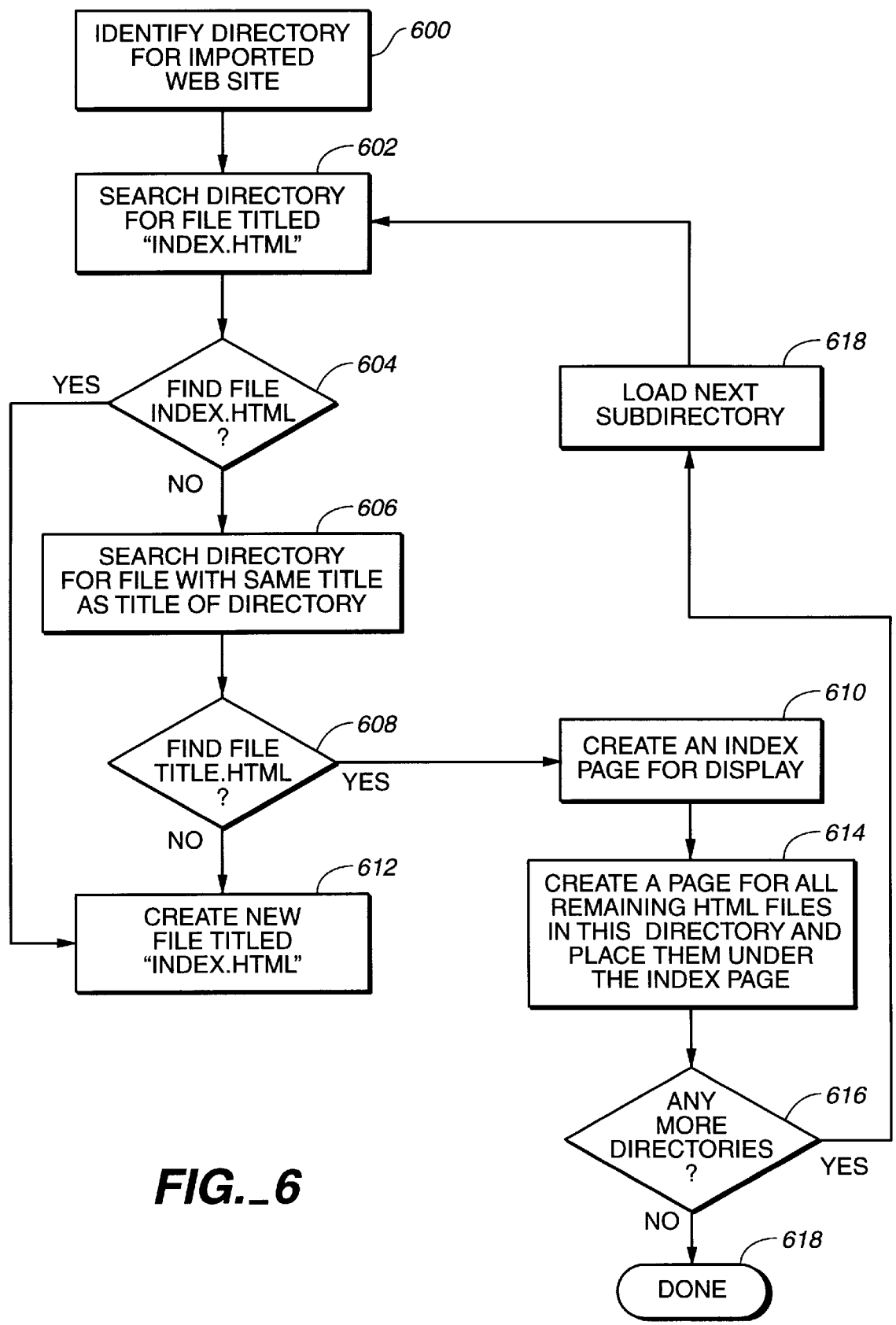
FIG._6

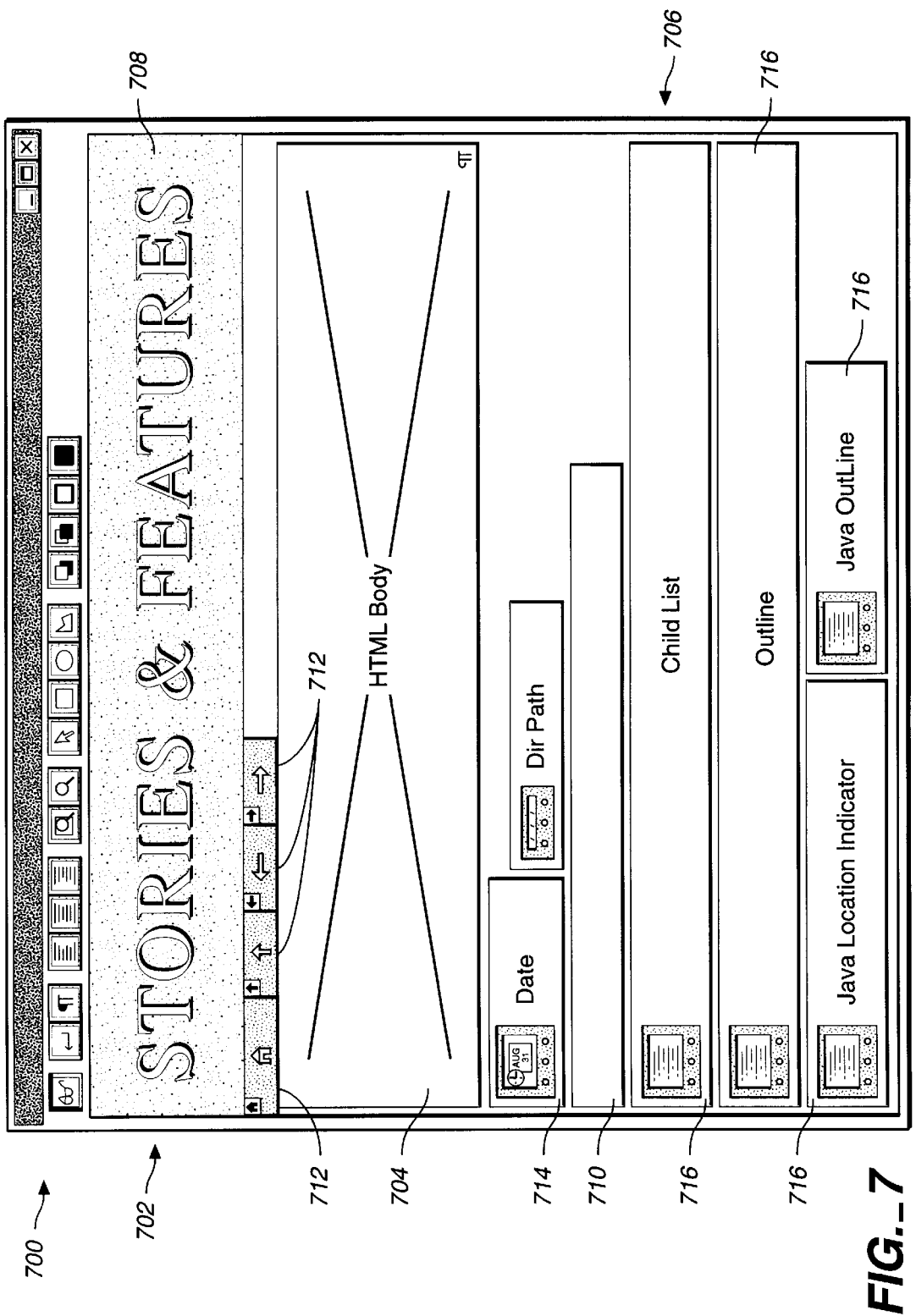
FIG._7

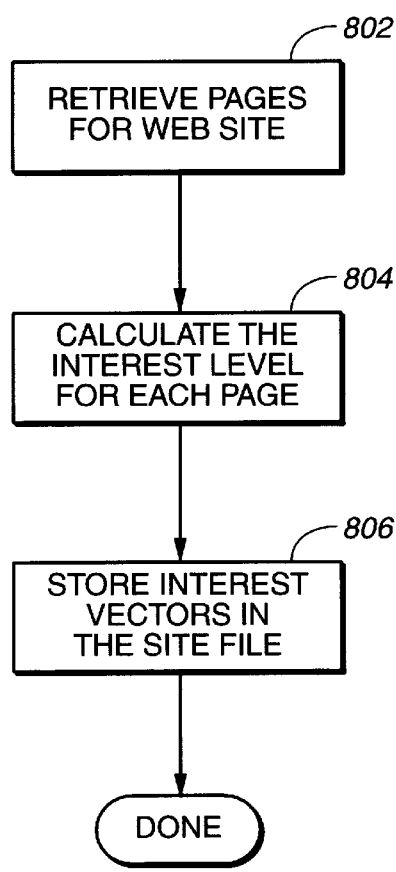
FIG._8a
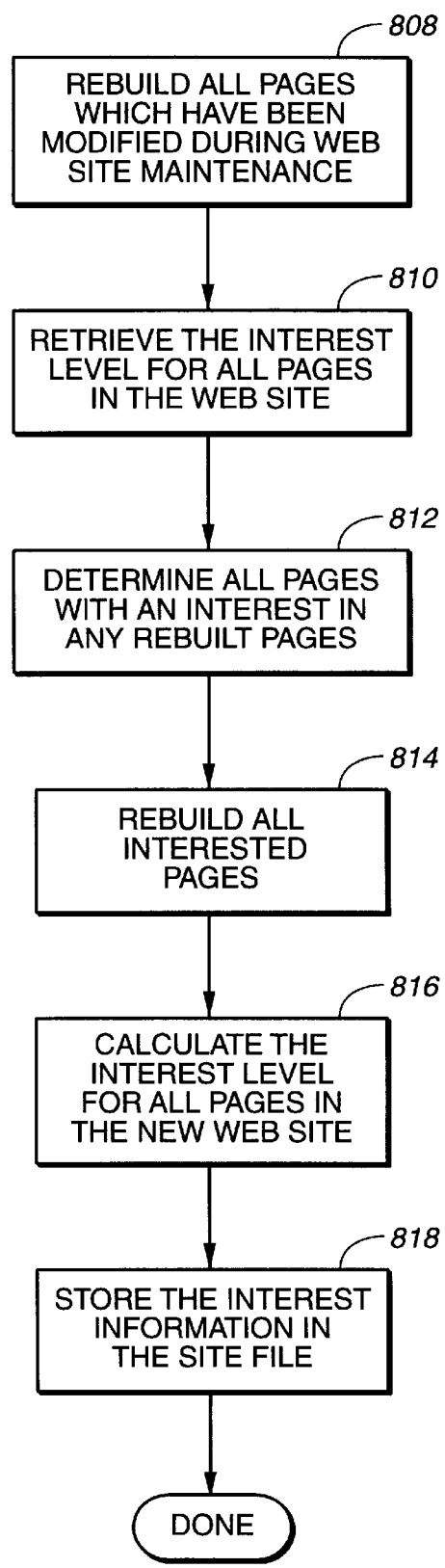
FIG._8b

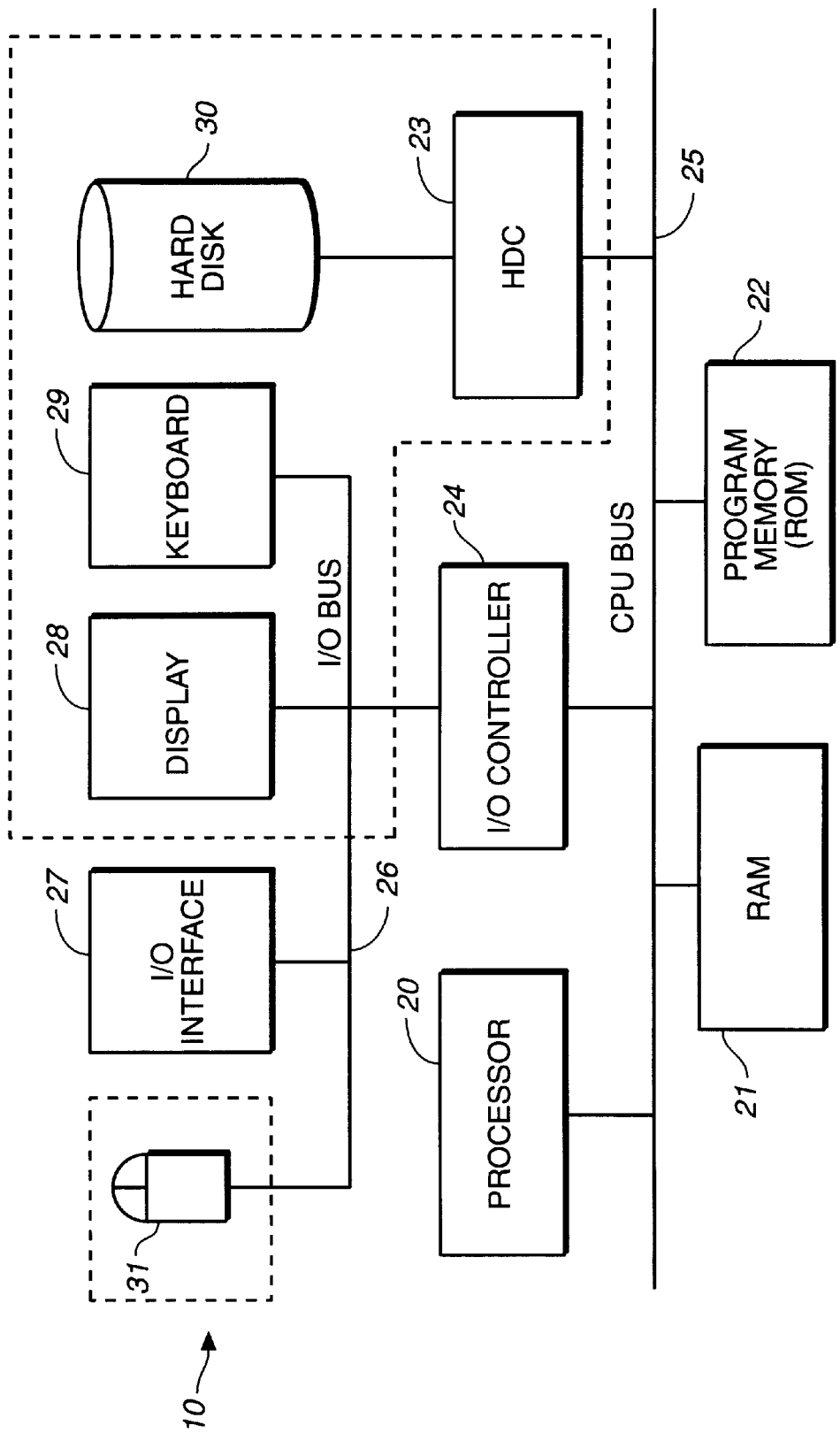
FIG._9

WEB SITE CONSTRUCTION BY INFERRING NAVIGATIONAL STRUCTURE FROM PHYSICAL FILE STRUCTURE

BACKGROUND OF THE INVENTION

The present invention relates generally to computer networks, and more particularly to building a network site.

The Internet is a world-wide network of interlinked networks connected by specific protocols (e.g., the Internet Protocol (IP)). The Internet provides for file transfer, remote login, electronic mail, news and other services. The World Wide Web (the "Web") is a hypertext based system for finding and accessing Internet resources. Hypertext refers to specific content elements within a document that contain links to other documents. A user desiring to retrieve information from the Web invokes a browser, a client program that runs on a client computer (Windows, Mac or UNIX environment), allowing a user to display documents retrieved from the Web.

Information is organized on the Web in web sites. A web site is a collection of linked files resident on a server that may be accessed by a browser application. Typically, the web site contains a initial page (the "home page"), which is displayed when the browser first accesses the site. The web site may include one or more other pages which may be accessed by selecting links resident on the home page or other pages within the web site.

The process of constructing a web site includes identifying content for display, structuring the content, building the web site, and transferring the final product to a web server. The process of building the web site includes creating the hypertext mark-up language (HTML) associated with the links for a particular page of content.

After a web site has been constructed, the HTML files (pages) are stored in a file structure. As was described above, the pages of the web site contain one or more links to other pages in the site. The links provide a navigational structure for traversing pages in the web site.

Over time, a user may desire to alter the appearance of one or more pages in the web site. The alteration may be due to changes in the content desired to be displayed or changes driven therefrom. A user desiring to alter the appearance of any page in the web site typically creates a new page in HTML with the revised content. Alternatively, the user may revise an existing HTML file associated with a given page changing any desired content elements and any links.

When changes are made to a page (the "modified page"), links to other pages on the modified page may be changed. In addition, links pointing to the modified page which are located on other pages in the web site may be required to be changed. Often, users start from scratch constructing an entire new web site depending on the magnitude of changes to the existing web site pages.

Conventional web site construction tools do not afford a designer flexibility in making changes to existing web sites. Part of the reason for this is the nature of the web site files.

Typically, the HTML files stored in the file structure are not physically linked and may be ordered in any fashion desired. The linking of pages in the web site is hard coded and embedded in the HTML for each file. At build time for a web site, links are calculated based on the location of the page being called.

However, while there is no requirement to physically link or order files in the file structure, designers tend to build web sites in a structured manner, providing an inherent logical ordering to the files stored in the file structure. Conventional web site build tools do not take advantage of this inherent structure during the build or rebuild process. As such, rebuilding web sites with conventional tools often necessitates the rebuilding of the entire web site in order to establish a different relationship between individual pages in the web site.

SUMMARY OF THE INVENTION

In general, in one aspect, the invention provides a method inferring navigational hierarchy for a web site from an existing file hierarchy where the existing file hierarchy includes one or more HTML files. The method includes inferring a navigational hierarchy for a web site from physical relationships between the HTML files stored in the existing file hierarchy.

Preferred embodiments of the invention include the following features. The method may include ordering the HTML files according to the navigational hierarchy for manipulation by a web site construction tool and displaying the ordered HTML files in a tree structure or an organizational chart structure indicative of the navigational hierarchy for the web site.

The existing file hierarchy may include a directory and one or more sub-directories each including one or more HTML files. The method may include creating an initial level in the navigational hierarchy for all HTML files in the directory. Each file in the initial level includes a link to a next sequential file physically located in the file hierarchy that is assigned to the initial level of the navigational hierarchy. The method may include creating a second level in the navigational hierarchy for HTML files in a sub-directory of the directory. A first file in the second level in the navigational hierarchy may be linked to a file in the initial level of the navigational hierarchy. Each file in the second level may be linked to a next sequential file physically located in the file hierarchy that is assigned to the second level of the navigational hierarchy.

In another aspect, the invention provides a method of inferring a navigational hierarchy for files in a file hierarchy where the file hierarchy includes one or more HTML files associated with a previously constructed web site. The method includes inferring a navigational hierarchy for a new web site from names of the HTML files associated with the previously constructed web site stored in the file hierarchy.

Preferred embodiments of the invention include the following features. The file hierarchy may include a directory for storing the HTML files. The method may include inferring that a file named INDEX.HTML or TITLE.HTML stored in the directory is a homepage for the previously constructed web site.

In another aspect, the invention provides a method of constructing a web site that includes identifying a directory containing a previously constructed web site. The directory has a name. The method includes locating a file named INDEX.HTML in the directory, and if no INDEX.HTML file is located, then locating a file named TITLE.HTML. If no file is located, then an index file is created and stored in the directory. An index page is created in a navigational structure associated with the web site that points to INDEX.HTML or TITLE.HTML or the index file. The index page is displayed in depicting the navigational structure in a display space in a window generated by a graphical user interface for display on an output device to a user. A page is created in the display space pointing to a corresponding HTML file in the directory for each HTML file stored therein. The page is placed on the same hierarchical level in the navigational hierarchy as the index page.

The invention includes numerous advantages. A tool is provided for importing partially constructed web sites for inclusion in a new web site. The tool infers navigational structure from the physical location of files in the partially constructed web site to allow for the easy integration of the partially constructed web site into a new web site having a separate navigational and physical hierarchy.

Previously constructed web sites may be easily rebuilt to include a navigational structure that allows for the easy maintenance of web sites.

Inherent structure in an existing web site can be recognized and exploited in developing a new web site derived therefrom where the new web site includes a navigational structure which allows for the easy rebuild of the site at later time.

Other advantages and features of the invention will be apparent from the following description and claims.

BRIEF DESCRIPTION OF THE DRAWINGS

FIG. 1 is a flow diagram of the process of building a web site according to a preferred embodiment of the invention.

FIG. 2 is a functional block diagram of the web site building software of the preferred embodiment.

FIG. 3 is a functional block diagram of the program module.

FIG. 4b is an alternative window of the graphical user interface of the invention.

FIG. 5 is a flow diagram of the process for moving a page in a hierarchial navigational structure.

FIG. 6 is a flow diagram of the process for inferring structure from a web site file structure.

FIG. 7 shows the graphical user interface for constructing a master page.

FIG. 8a is a flow diagram for performing a build of a web site.

FIG. 8b is a flow diagram for performing an incremental rebuild of a web site.

FIG. 9 is a block diagram of a programmable information processing system according to the invention.

DESCRIPTION OF THE PREFERRED EMBODIMENT

Figure 4A:
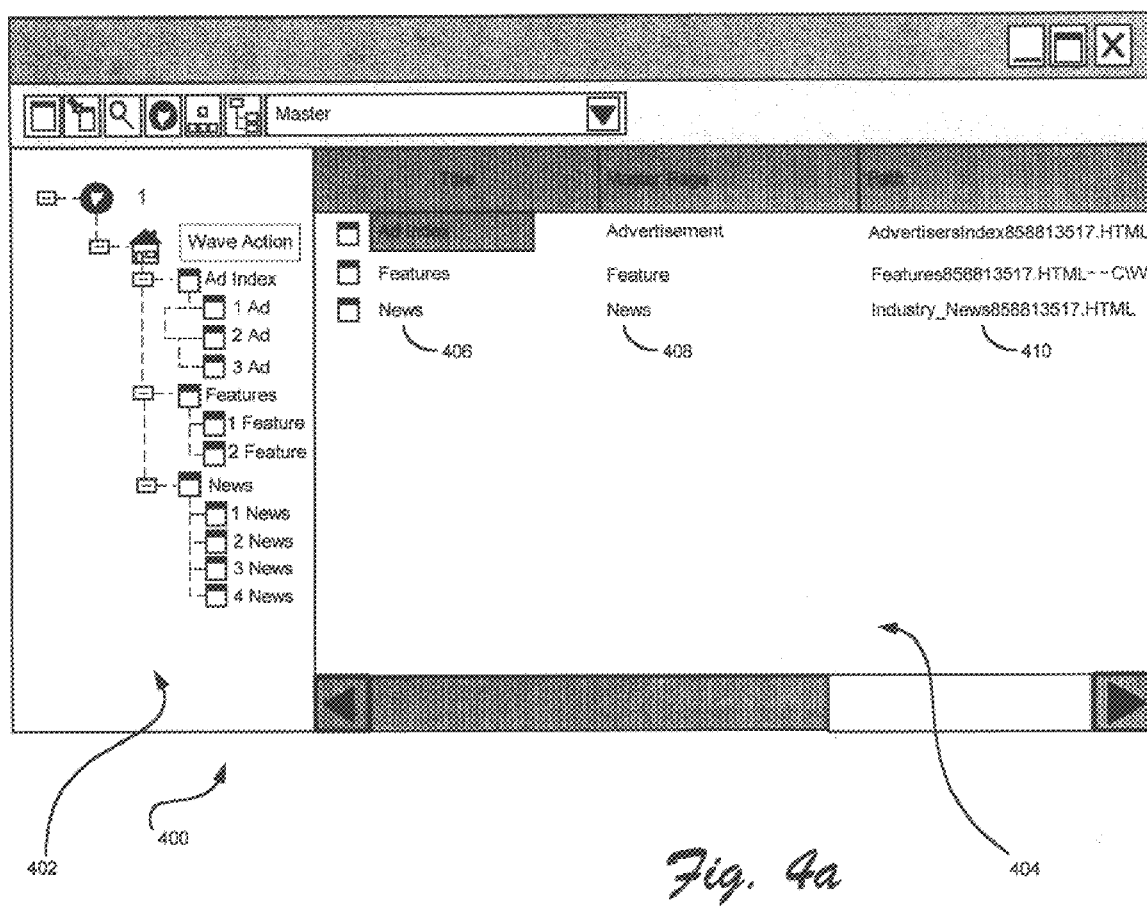
FIG. 4a is a window of the graphical user interface according to the invention.

Referring to FIG. 1, the process of building a web site includes identifying pages to be displayed (100). The identification process may include importing pages into a file structure. The file structure is a placeholder for all the pages to be displayed on the web site. Alternatively, each page may be imported at the time for the build of the web site.

A web site is typically comprised of a number of pages. The pages contain content. The content may include data, images and pointers or links to other pages in the web site or other destinations on the World Wide Web. After all the pages have been identified, the user arranges the pages of the web site according to a display order (102). The display order defines the relationships between the pages and provides a navigational structure for traversing the web site. The development of the navigational structure for the web site is discussed in greater detail below in association with FIG. 4a.

Finally, the pages are integrated and transformed into a suitable format for display (the "build") (104). Building the site includes creating a site file, creating HTML (hypertext markup language) and resolving any embedded content. Thereafter the completed site is uploaded to a web server so it may be accessed by individuals on the World Wide Web (106). After a web site is constructed, the web site may be required to be reconstructed due to changes in pages to be displayed or relocation of links embedded therein (108).

With reference to FIG. 2, a software web site building mechanism 200 includes a program module 202, a master page module 204, a rebuild module 206 and a graphical user interface 208. In one embodiment, web site building mechanism 200 is a computer program tangibly stored on a computer readable medium including instructions for causing a computer to build and maintain a web site.

Program Module

With reference to FIG. 3, program module 202 includes methods and tools for constructing a web site including an initialization routine 300, an import routine 302, a structure routine 304, a build routine 306, and file system 308.

a) Initialization Routine

Initialization routine 300 includes a method for initializing graphical user interface 208 (FIG. 2) to cause the display of a window including work space 400 having a hierarchial display space 402 and textual display space 404 as is shown in FIG. 4a. In one embodiment, hierarchial display space 402 presents a selected web site in tree fashion, showing the hierarchial relationship of the various pages of the web site. Each entry in hierarchical display space 402 includes a label, a pointer and a parameter. The label indicates the name of the page in the web site. The pointer points to the HTML file in the file system that corresponds to the particular entry. The parameter defines the structural relationship between the given page and other pages in the web site. Alternatively, hierarchial display space 402 may display a web site in a organizational chart format as is shown in FIG. 4b.

Referring again to FIG. 4a, textual display space 404 provides a textual description of the attributes associated with each page in the web site displayed in hierarchial display space 402. The attributes include title 406, master page identifier 408 and path 410. Title 406 is the title for the particular web page and corresponds to a title displayed in the hierarchial display space 402. Master page identifier 408 indicates the master page to which a given page has been assigned. Master pages will be described in greater detail below in conjunction with FIG. 7. Path 410 indicates the location of the page in the file system 308 (FIG. 3).

b) Import Routine

Referring agin to FIG. 3, import routine 302 includes methods for importing pages from files stored on a local computer or from other remote locations. Typically, import routine 302 retrieves full pages of user selected content. Alternatively, the user may retrieve portions of pages and combine them into a single page for display on the web site using a page building tool such as PageMill™ produced by Adobe Systems Incorporated, San Jose Calif. Once invoked, import routine 302 navigates the file structure for a local or remote computer to locate the page to be imported.

Import routine 302 may generate a request for a page to be transferred from a remote location. Once identified (or requested), the page is retrieved (received) and may be stored in file system 308 until required to support build operations for a particular web site. File system 308 may physically store all the pages to be used in a web site. Alternatively, the import routine may be invoked at build time to retrieve particular pages from remote locations. File system 308 is a placeholder for pages, and partial or complete web sites which have been constructed with the tools disclosed herein or by other means.

c) Structure Routine

Upon receipt of a page, structure routine 304 enables the placement of the page into the web site at a user selected location. Structure routine 304 may be invoked as each page is imported or after all of the pages are imported into file system 308.

Structure routine 304 implements a tree structure for placement of pages into a web site. Structure routine 304 defines a navigational structure for pages (files) in which no purely structural elements (such as directories or folders) are required. Structure routine 304 assigns each page structure based on the navigational structure for the web site as selected by a user. As a page is placed in the navigational hierarchy, structure routine 304 sets a (navigation) parameter for the page that defines a relationship between a given page and other pages in the navigational hierarchy.

Accordingly, structure routine 304 may assign to each page up to three levels of structure. At a minimum, a page includes a base structure, that is, the page is assigned to a particular hierarchical level in the tree structure. One or more other pages may share this same base structure. In addition, a page may have a sub-structure or a super-structure assigned (indicating that the page is a parent or child of another page). A sub-structure assignment indicates that one or more pages are assigned to a next lower hierarchical level below the base structure for the given page. A super-structure assignment indicates that one or more pages are assigned to a next upper hierarchical level above the base structure for the given page. An example of the structural relationship between pages is shown in hierarchical display space 402 of FIG. 4*a*.

Structure routine 304 may be used to move pages within the navigational structure. Structure routine 304 moves pages by reassigning the structural relationships for the page to be moved. While the page is stored in the same physical space in the file system, it may be easily moved in the web site navigational structure by manipulating the page structural relationships.

1. Drag and Drop Mechanism

In one embodiment, structure routine 304 includes a drag and drop mechanism 312 for initially placing or subsequently manipulating pages in the navigational structure. Drag and drop mechanism includes methods for responding to user input received from a mouse or other pointing device used in conjunction with the web site building tool described herein. While the drag and drop mechanism is described in terms of dragging and dropping pages into a web site navigational hierarchy, this description is illustrative of the invention and should not be construed as limiting.

Drag and drop mechanism 312 allows a user to select a page from the file system or the navigational structure (as displayed in the hierarchical display space 402 of FIG. 4*a*), drag it to a (new) position in the navigational structure, and drop it. Drag and drop mechanism 312 includes a selection mechanism 314, positioning mechanism 316, and variable drop mechanism 318.

Selection mechanism 314 includes methods for selecting an object (a page) to be placed in the file structure. Selection mechanism 314 is responsive to user input indicating a file to be placed in the file structure. Selection mechanism 314 may store the name and location of a selected item and may include methods for producing a image movable on the graphical user interface relative to the position information received at the position mechanism from the user. Positioning mechanism 316 tracks user input to resolve a location in the file structure (or navigational hierarchy) where the object (page) is to be dropped.

Variable drop mechanism 318 provides an option prompt 320 to the user for allowing the accurate placement of the page relative to the position indicated by the positioning mechanism. Option prompt 320 includes user selectable options to position the page at the same hierarchical level, at a sub-level or a super-level of the position indicated by the positioning mechanism. That is, the position indicated by the positioning mechanism indicates in general the new position for the page, while the user selectable option provides the precise relationship between the position and the desired location for a given page.

In one embodiment, the variable drop mechanism displays the option prompt automatically when an object is dropped. Alternatively, the variable drop mechanism may include a placement option prompter which is responsive to a user input. Once a user input is detected (such as depressing a hot key) then the placement option prompter initiates the display of option prompt 320.

In one embodiment, drag and drop mechanism 312 uses a single button of a mouse (the right mouse button) to select (depress the right mouse button), drag (move the mouse while holding down the right button), and "variably" drop (by release of the right button). The variable drop mechanism provides option prompt 320 to the user at the time the drop occurs (at the release of the right mouse button). Option prompt 320 allows a user to drop the page into the level of the navigational structure indicated by the mouse pointer, or at a level above or below.

In another embodiment a typical drag and drop mechanism utilizing the left button of the mouse is used to select and position a file (page) to be relocated. At the time for the drop, a right mouse button or other hot key is used to prompt a selection for the drop.

Referring now to FIG. 5, the process of moving a page in a hierarchical navigational structure includes selecting an object (page) (500). The user drags the object to a (new) location in the navigational structure (502), and actuates a hot key during the drop process (504). The hot key (or right mouse button option) is invoked during the drop action which prompts the display of placement options (506). Thereafter, the user may select from the placement options how to drop the selected object (page) relative to the drop location (508). Finally, the drag and drop mechanism places the object at the user selected position (510).

2. Inference Engine

Referring again to FIG. 3, import routine 302 may import entire web sites. If the previously built web site was constructed according to the navigational structure described above, a user may position the imported web site at a desired location in the new web site by manipulating drag and drop mechanism 312 as described above and maintain the existing navigational structure for each page as defined by the previously built web site.

If, however, the pages of the previously constructed web site were not organized according to the navigational structure, then the web site building mechanism may be used to infer structure from the file structure associated with the previously constructed web site. In one embodiment, structure routine 304 includes an inference engine 322. Inference engine 322 infers navigational structure to an existing web site based on the organization of HTML files in the file system structure. The inference engine may be used on completed web sites or in conjunction with partially completed web sites.

With reference to FIG. 6, a user may construct a web site from a previously constructed web site by identifying a directory which contains the physical HTML files associated with the previously constructed web site. An inference engine 322 within the web site build tool receives directory information (a directory name) which identifies the directory (the root directory) containing the HTML files associated with the old web site (600). The inference engine scans the directory searching for a file named "INDEX.HTML" (602), which is typically the home page of a web site.

If no INDEX.HTML file is located (604), then the inference engine checks to determine if a file exists with the same name as the directory in which the engine is searching (606). Occasionally, a web site which is under construction or contains only a portion of a web site page content may include a file named TITLE.HTML, where TITLE is the name of the root directory being searched.

If no file is located in step 606 (608), then the inference engine creates a new file named "INDEX.HTML", stores it in the directory (612) and continues at step 610. If the "INDEX.HTML" file is located in step 602 or if a file whose name is the same as the directory being searched is located in step 608, then a page (the "index page") is created for display in the hierarchical display space 302 (FIG. 3) that points to either the INDEX.HTML or TITLE.HTML page located (or created) above (610).

The inference engine thereafter examines the remaining entries in the root directory. For all HTML files, the inference engine creates a page for display in the hierarchical display space pointing to the particular HTML file and places this page on the same hierarchical level as the index page (associated with the INDEX.HTML file) in the hierarchical display space (creating a series of siblings to the INDEX.HTML page)(614). In one embodiment, the index page is the only page in the first hierarchical level and all pages may be considered children of the index page.

If sub-directories are located in the root directory, each is loaded (618) and the process is repeated at step 602. At the sub-directory level, an index page is created (if not located in the sub-directory) which is a parent (in the navigational structure) to all pages derived from HTML files contained in the sub-directory. The process continues until all the files and directories in the root directory have been resolved (616). Accordingly, the physical file system is manipulated to create a navigational hierarchy which does not contain any purely structural elements. Pages with navigational structure are substituted for any structural elements in the physical file system.

d) Build Routine

Referring again to FIG. 3, build routine 306 includes methods for creating HTML, creating a site file and resolving embedded content. Build routine 306 converts all of the elements associated with a single page into a standard flow based description language (HTML). Note, some of the elements of a page may already be in HTML format. For example pages imported into the web site for placement into the body (unique) section of a master page are typically written in HTML. The unique section of a master page will be discussed in more detail below in conjunction with the master page module.

HTML describes the multimedia contents of a page in a unidirectional stream that allows for the easy display of the contents. The process of converting ASCII text or images into an HTML file which can be uploaded to a server is known in the art.

The site file includes a build identifier for identifying the time that the particular web site was constructed and interest vectors for each page in the web site. Interest vectors will be discussed in further detail below in association with the rebuild module.

At the time for build and conversion to HTML, build routine 306 resolves embedded content in the common portion of a page for all pages in the site having master pages. Embedded content includes links to other web sites and navigational links to other pages within the given web site. Build routine 306 resolves the embedded content by determining the actual address or file location for the embedded content and includes this information in the HTML for a given page.

In one embodiment, build routine 306 includes an interest engine 307. Interest engine 307 calculates the interest level for a page at the time of build based on the placement of the page in the navigational structure and the type of links that are included in the common portion of a master page which is associated with a given page. This interest level information is stored in the site file for the web site. At the time for a rebuild, a discrimination engine within the rebuild module 206 (FIG. 2) checks to determine which pages need to be rebuilt and performs an incremental update to the web site based on the interest information stored in the site file associated with a given web site. The process of the incremental rebuild is discussed in greater detail below in association with FIG. 8b.

Referring now to FIG. 8a, in a process for building a web site, at build time, the pages (including master pages) associated with a web site are retrieved by the build module (802). The interest engine in the build routine calculates the interest level for each page in the final constructed web site based on the navigational structure for the web site (804). In one embodiment, the interest level is stored as a four entry vector with each vector corresponding to one of four "directions" in which a page may have an interest (up, down, left, and right).

A page (referred to as the "base page") has an interest in another page (the "interest page") when a link required in the base page indicates the interest page. For example, a "next page" navigational link positioned in the common portion of a master page template used for the base page indicates that the base page has an interest in the next page in the navigational structure at the same hierarchical level. In this example, the vector associated with the right entry stored in the site file for this particular page would indicate an interest level. At the time for rebuild if the interest page had been updated, then the base page would also be rebuilt.

The left entry refers to pages in the same hierarchial level that immediately precede the base page. The up entry refers to a parent page (grandparent, great grandparent etc.), and the down entry refers to a child page (grandchild, great grandchild etc.). The left and right interest level for a given base page may be only one level deep (e.g., the next or previous page). However, the interest level up and down for a base page may be several levels deep. For example, changes in a grandparent page (two levels up in the hierarchy) may have an effect on a given base page.

Once all the interest levels are calculated, the interest vectors are stored in the site file associated with the web site (806).

Alternatively, interest engine 307 may be part of program module 202 (FIG. 2). At the program module level, interest engine 307 may record the interest of each particular page at the time the page has a master page assigned based on the links contained therein.

Master Page Module

Master page module 204 (FIG. 2) includes methods for constructing a master page. Referring now to FIG. 7, a master page 700 includes a common region and a unique region. The common region is a user definable portion of a page which is to be common to all pages to which a master page is applied. The unique region is a placeholder for a page of content. The page is typically written in HTML and may include links to other pages on the Web. The common region may include a header region 702 and footer region 706. The unique region includes body 704.

A master page may be applied to one or more pages in a web site. When applied to more than one page, the master page common region (header and footer regions) is displayed for each page. Header region 702 and footer region 706 are functionally identical, only differing in their respective placement relative to body region 704. Within header region 702 and footer region 706, a user may place one or more elements. Elements are selected by the user for display in the header and footer region for the master page. Elements include multimedia elements 708, layout indicators 710, navigational links 712, textual links 714 and control elements 716.

Multimedia elements 708 include text, image data, sound, video and applets (including java applets). These type of elements are common in web pages for identifying the particular web site. For example, a master page may include a company name or logo which is to be displayed on all pages of the web site.

Layout indicators 710 include alignment guides (left, right, top, bottom, center, and bounding box) and line breaks. A bounding box is an alignment guide which includes a rectangular box which may be sized as required by a user. Line breaks indicate the end of a group or sequence of elements.

Navigational links 712 include external links, absolute links and relative links. External links provide links to locations outside the current web site. Absolute links provide a link within a web site to a fixed location in the site. For example, a link to the home page for a web site is an absolute link.

Relative links are conditioned on the navigational structure of the web site and the actual addressing for such is not determined until build time. Relative links include previous, next, parent and child links. Previous and next links are links to adjacent pages at the same hierarchical level. Parent and child links are links to pages either one hierarchical level above or below a given page. For each relative link, build routine 306 (FIG. 3) looks at the navigational structure defined for the web site and, based on the relationships of the various pages, calculates links to appropriate elements in the structure automatically at build time.

A relative link may be in the form of a button having an associated action which is defined by the user. Buttons allow for the traversal about the web site based on the navigational structure associated therewith. During the master page build, these relative links are placed in the header or footer without requiring the user to calculate the exact link address associated with the given action.

Textual links 714 include text which is dependent on information other than the navigational structure. The web site builder creates a place holder for the textual link, and the web site build module calculates the actual text displayed at the time of the build. An example of a textual link is a "date" function. The date function is a tool for displaying the date the web site is built. Other textual links include a time function (time of day), an ISP (or web server) service provider identifier, a title function (which shows the name of the page), and a news function (which provides a placeholder for broadcasting current news, events or commercial advertisement information).

Control elements 716 include special relative navigational links such as the direct path function, outline function, and child list function, java applets and other control elements.

The direct path function provides a link list of the direct path back to the home page from the current page. The link list includes individual textual entries to each page in the direct path back to the home page. Each textual entry includes a hyperlink for jumping back to the associated page.

The outline function provides a textual list of one or more levels of the hierarchical structure associated with a given page. An example of the use of the outline function is the creation of a child list (a list of all pages in the next hierarchical level below the present page on the navigational structure). A child list includes a textual entry for each child for a given page and a hyperlink to the respective pages. The text and hyperlinks are calculated at build time.

Alternatively, the outline function may be used to create a sibling list (all the pages in the same hierarchical level), parent list (hierarchical level above the present page), or grandparent or grandchild list (two hierarchical levels above or below the present page). Again, at the time for build, the navigational structure is used to calculate the exact text for each entry in the list as well as a hyperlink for jumping directly to a selected page.

Master pages present one difficulty in the calculation process performed at build time for relative links and control elements. Edge conditions arise when a navigational link designated for a particular page indicates a link which is off the navigational structure (e.g., to a non-existing page). One example of an edge condition arises in the use of a next page navigational link in a master page. The last page in the hierarchical structure has no corresponding next page to link to in the hierarchal structure. Accordingly, it is desirable that build routine 306 (FIG. 3) accommodates for these types of conditions.

As described above, a link may be in the form of a button and an associated action. The button includes an image (often an arrow) and an address (the link to the next page). In one embodiment, edge cases are handled by either modifying the display of the link (the button image) or modifying the action associated with the link. In one embodiment, the modification to the display may be performed by shading or otherwise obscuring the button to ensure that the user understands that the link option is not viable at this point. In addition, the link action may be disabled. Alternatively, the action may be modified, for example, to provide a rollover action to the next page at the beginning of the same hierarchical level.

In operation, the master page module is a tool for defining the various elements to be placed in the header and footer for a master page. The master page module includes a linking mechanism for linking a master page to a plurality of pages of content. A user may invoke the linking mechanism by indicating in the textual display space for a given page (as indicated by the title of the page stored in the title field) the name of the appropriate master page in the master page identifier field. At build time for the web site, the linking mechanism provides the appropriate identifiers for the unique and the common portions of a page to the build module to create a final page. During the build process, the header, content, then footer are processed serially to create the actual HTML for the page.

Rebuild Module

Referring again to FIG. 2, rebuild module 206 allows for incremental rebuilds of the web site after the initial build. To do so, the rebuild module evaluates the "interest" a given page of content (including the links defined in an associated master page) has on other pages in the navigational structure. At the time for a rebuild, only pages which are physically updated and any pages that had an interest in an updated page are required to be rebuilt.

Rebuild module 206 includes a discrimination engine 212. The discrimination engine evaluates the interest vectors associated with a web site to determine which files are required to be rebuilt. The process for an incremental rebuild is shown in FIG. 8b. At the time for a rebuild, rebuild module 206 (FIG. 2) rebuilds all pages in the web site which have been modified from their original format (808). Thereafter, discrimination engine 212 (FIG. 2) retrieves the interest level data for each page in the web site from the site file (810). The discrimination engine then determines which other pages in the web site have an interest in any of the pages that have been rebuilt in step 808 (812). For each "interested page" the build module rebuilds the page (814). Thereafter, the interest engine calculates the interest level for each page in the rebuilt web site (816) and stores this information in the site file (818).

In one embodiment, the rebuild process is accomplished in a safe manner by relocating any files that are to be updated from the file structure to an alternate location. Only after the entire rebuild is successful are the relocated files purged from the build mechanism system. Alternatively, the files may be maintained and dated to allow for archiving of old builds. In this way, the rebuild process may be interrupted or otherwise fail without corrupting the original build data.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, FIG. 9 shows a block diagram of a programmable information processing system (computer) 10. Computer 10 preferably includes a processor 20, random access memory (RAM) 21, a program memory 22 (preferably a writable read-only memory (ROM) such as a flash ROM), a hard drive controller 23 and an input/output (I/O) controller 24 coupled by a CPU bus 25.

Hard drive controller 23 is coupled to a hard disk 30, which may be used for storing application programs, such as the present invention and data. I/O controller 24 is coupled by means of an I/O bus 26 to an I/O interface 27. I/O interface 27 receives and transmits data in analog or digital form over communication links such as a serial link, local area network, wireless link, and parallel link. Also coupled to I/O bus 26 is a display 28, a keyboard 29 and a pointing device (mouse) 31. Alternatively, separate connections (separate buses) may be used for I/O interface 27, display 28, keyboard 29 and pointing device 30. Programmable processing system 10 may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory 22 or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting. Other embodiments are within the scope of the following claims.

What is claimed is:

1. A computer implemented method inferring navigational hierarchy for a web site from an existing file hierarchy, the existing file hierarchy including one or more HTML files, the method comprising:

providing an inference engine operable to evaluate the existing file hierarchy and determine a navigational hierarchy for a web site; and inferring the navigational hierarchy for the web site from physical relationships between the HTML files stored in the existing file hierarchy using the inference engine.

2. The method of claim 1 further including ordering the HTML files according to the navigational hierarchy for manipulation by the web site construction tool.

3. The method of claim 2 further including the step of displaying the ordered HTML files in a tree structure indicative of the navigational hierarchy for the web site.

4. The method of claim 2 further including the step of displaying the ordered HTML files in an organizational chart structure indicative of the navigational hierarchy for the web site.

5. The method of claim 1 wherein the existing file hierarchy includes a directory and one or more sub-directories each including one or more HTML files.

6. The method of claim 5 further including the step of creating an initial level in the navigational hierarchy for all HTML files in the directory.

7. The method of claim 6 wherein each file in the initial level includes a link to a next sequential file physically located in the file hierarchy that is assigned to the initial level of the navigational hierarchy.

8. The method of claim 6 further including creating a second level in the navigational hierarchy for HTML files in a sub-directory of the directory.

9. The method of claim 8 wherein a first file in the second level in the navigational hierarchy is linked to a file in the initial level of the navigational hierarchy and where each file in the second level is linked to a next sequential file physically located in the file hierarchy that is assigned to the second level of the navigational hierarchy.

10. A computer implemented method inferring a navigational hierarchy for files in a file hierarchy, the file hierarchy including one or more HTML files associated with a previously constructed web site, the method comprising:

providing an inference engine operable to evaluate the file hierarchy and determine a navigational hierarchy for the previously constructed web site; and inferring a navigational hierarchy for a new web site from names of the one or more HTML files stored in the file hierarchy using the inference engine.

11. The method of claim 10 wherein the file hierarchy includes a directory for storing the HTML files and the method further includes the step of inferring that a file named INDEX.HTML stored in the directory is a homepage for the previously constructed web site.

12. The method of claim 10 wherein the file hierarchy includes a directory for storing the HTML files and the method further includes the step of inferring that a file stored in the directory having a same name as the directory is a homepage for the previously constructed web site.

13. A method constructing a web site comprising:
   (a) identifying a directory containing a previously constructed web site, the directory having a name;
   (b) locating a file named INDEX.HTML in the directory;
   (c) if no INDEX.HTML file is located, then locating a file having the name;
   (d) if no file is located in step (c), then creating an index file and storing the index file in the directory;
   (e) automatically creating an index page in a navigational structure associated with the web site that points to the file located in steps (b) or (c) or the file created in step (d), and displaying the navigational structure in a display space in a window generated by a graphical user interface for display on an output device to a user; and
   (f) creating a page in the display space pointing to a corresponding HTML file in the directory for each HTML file stored therein and placing each page on the same hierarchical level in the navigational hierarchy as the index page.

14. A computer program inferring navigational hierarchy for a web site from an existing file hierarchy, the existing file hierarchy including one or more HTML files, the computer program tangibly stored on a computer-readable medium, containing instructions for causing a computer to:

provide an inference engine operable to evaluate the existing file hierarchy; and infer a navigational hierarchy for a web site from physical relationships between the HTML files stored in the existing file hierarchy using the inference engine.

15. The computer program of claim 14 further including instructions for causing a computer to order the HTML files according to the navigational hierarchy for manipulation by a web site construction tool.

16. The computer program of claim 15 further including instructions for causing a computer to display the ordered HTML files in a tree structure indicative of the navigational hierarchy for the web site.

17. The computer program of claim 15 further including instructions for causing a computer to display the ordered HTML files in an organizational chart structure indicative of the navigational hierarchy for the web site.

18. The computer program of claim 14 wherein the existing file hierarchy includes a directory and one or more sub-directories each including one or more HTML files.

19. The computer program of claim 18 further including instructions for causing a computer to create an initial level in the navigational hierarchy for all HTML files in the directory.

20. A web site construction tool inferring navigational hierarchy for a web site from an existing file hierarchy, the existing file hierarchy including one or more HTML files, the web site construction tool comprising:

means for evaluating the existing file hierarchy; and means for inferring a navigational hierarchy for the web site from physical relationships between the HTML files stored in the existing file hierarchy.

* * * * *